United States Patent
Mukherjee et al.

(10) Patent No.: US 7,418,544 B2
(45) Date of Patent: Aug. 26, 2008

(54) METHOD AND SYSTEM FOR LOG STRUCTURED RELATIONAL DATABASE OBJECTS

(75) Inventors: Niloy Mukherjee, Belmont, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 344 days.

(21) Appl. No.: 11/245,359

(22) Filed: Oct. 5, 2005

(65) Prior Publication Data

US 2007/0088912 A1     Apr. 19, 2007

(51) Int. Cl.
*G06F 12/16* (2006.01)
*G06F 17/30* (2006.01)

(52) U.S. Cl. .................. 711/111; 711/4; 711/141; 711/162; 707/201; 707/204

(58) Field of Classification Search ............ 711/4, 711/111, 141, 142, 143, 151, 162; 709/201, 709/204
See application file for complete search history.

(56) References Cited

U.S. PATENT DOCUMENTS

| | | | |
|---|---|---|---|
| 6,173,313 B1 | 1/2001 | Klots et al. | |
| 6,192,377 B1 | 2/2001 | Ganesh et al. | |
| 6,233,648 B1 * | 5/2001 | Tomita ............... | 711/4 |
| 6,295,610 B1 | 9/2001 | Ganesh et al. | |
| 6,353,828 B1 | 3/2002 | Ganesh et al. | |
| 6,490,657 B1 * | 12/2002 | Masubuchi et al. ...... | 711/135 |
| 6,493,726 B1 | 12/2002 | Ganesh et al. | |
| 6,510,421 B1 | 1/2003 | Ganesh et al. | |
| 6,574,717 B1 | 6/2003 | Ngai et al. | |
| 6,631,374 B1 | 10/2003 | Klein et al. | |
| 6,647,510 B1 | 11/2003 | Ganesh et al. | |
| 6,684,223 B1 | 1/2004 | Ganesh et al. | |
| 6,714,943 B1 | 3/2004 | Ganesh et al. | |
| 6,728,719 B1 | 4/2004 | Ganesh et al. | |
| 6,804,672 B1 | 10/2004 | Klein et al. | |
| 6,957,236 B1 | 10/2005 | Ganesh et al. | |
| 6,961,729 B1 | 11/2005 | Toohey et al. | |
| 6,961,865 B1 | 11/2005 | Ganesh et al. | |
| 6,976,022 B2 | 12/2005 | Vemuri et al. | |
| 6,981,004 B2 | 12/2005 | Ganesh et al. | |
| 6,983,266 B1 | 1/2006 | Sinha et al. | |
| 7,010,529 B2 | 3/2006 | Klein et al. | |
| 7,047,386 B1 | 5/2006 | Ngai et al. | |
| 7,133,941 B2 | 11/2006 | Klein et al. | |
| 7,237,147 B2 | 6/2007 | Ganesh et al. | |
| 7,240,065 B2 | 7/2007 | Yang et al. | |
| 7,251,660 B2 | 7/2007 | Yang et al. | |
| 7,277,900 B1 | 10/2007 | Ganesh et al. | |
| 2002/0194206 A1 | 12/2002 | Ganesh et al. | |
| 2004/0054643 A1 | 3/2004 | Vemuri et al. | |
| 2004/0054644 A1 | 3/2004 | Ganesh et al. | |
| 2004/0177099 A1 | 9/2004 | Ganesh et al. | |
| 2005/0004936 A1 | 1/2005 | Potapov et al. | |
| 2005/0015563 A1 | 1/2005 | Yang et al. | |

(Continued)

*Primary Examiner*—Jack A Lane
(74) *Attorney, Agent, or Firm*—Vista IP Law Group LLP

(57) ABSTRACT

A system, method, computer program and article of manufacture for updating a disk that moves updates for a specific database object into available contiguous free data blocks, and writes the multiple updates to disk using a single disk access, maintaining database transactional and durability semantics.

30 Claims, 16 Drawing Sheets

U.S. PATENT DOCUMENTS

| | | |
|---|---|---|
| 2005/0050109 A1 | 3/2005 | Klein et al. |
| 2005/0055385 A1 | 3/2005 | Sinha et al. |
| 2005/0114409 A1 | 5/2005 | Sinha et al. |
| 2005/0120062 A1 | 6/2005 | Sinha et al. |
| 2005/0120064 A1 | 6/2005 | Sinha et al. |
| 2005/0125573 A1 | 6/2005 | Klein et al. |
| 2005/0240633 A1 | 10/2005 | Krishnaswamy et al. |
| 2005/0256829 A1 | 11/2005 | Yang et al. |
| 2005/0256849 A1 | 11/2005 | Krishnaswamy et al. |
| 2005/0256897 A1 | 11/2005 | Sinha et al. |
| 2005/0262110 A1 | 11/2005 | Gu et al. |
| 2005/0278350 A1 | 12/2005 | Yang et al. |
| 2005/0278359 A1 | 12/2005 | Yang et al. |
| 2006/0122963 A1 | 6/2006 | Klein et al. |
| 2006/0123200 A1* | 6/2006 | Ito et al. .................... 711/143 |
| 2006/0212492 A1 | 9/2006 | Jacobs et al. |
| 2007/0288529 A1 | 12/2007 | Ganesh et al. |

* cited by examiner

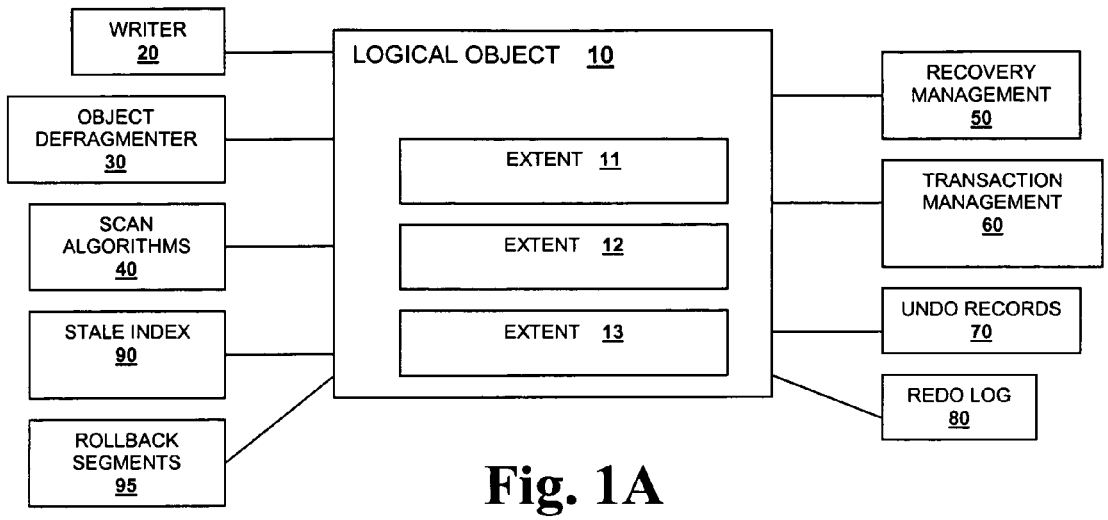
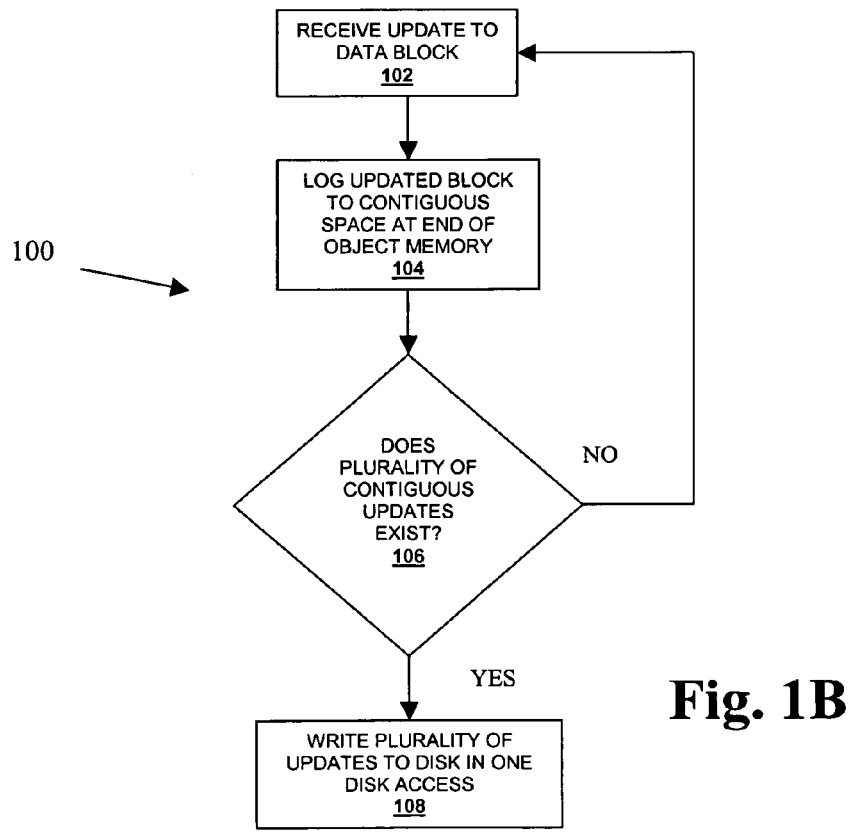
Fig. 1A
Fig. 1B

METHOD AND SYSTEM FOR LOG STRUCTURED RELATIONAL DATABASE OBJECTS

BACKGROUND AND SUMMARY

This invention related to computer systems, and more particularly to disk access in databases.

Over the last decade the computer industry has witnessed dramatic improvements in CPU speeds, memory sizes, and storage capacities. However, disk access times have improved at a slower rate with respect to these components. In certain applications, this slower improvement of disk access time efficiency causes bottlenecks. That is, many applications spend time waiting for disk access and thus do not realize the improvements in the other components. Recent technologies (such as RAIDS and storage area networks) offer much greater overall storage bandwidth as well as concurrent disk accesses, however, they still neglect the performance of a single disk access. The technology behind a single disk access (i.e., rotation and seek) has stayed the same over the years.

Databases consist of data files that contain data in the form of relational database objects. Example database objects include tables, clusters, partitions, and Large Objects (LOBs). At the physical level these objects are a group of fixed sized data blocks. Data blocks are assigned a physical address in the disk and do not move. Thus updates are performed to the block whenever the data contained in the block changes. In applications where numerous changes take place, the system experiences an increase in disk access, each access involving a rotation and seek for each data block. Existing solutions include buffer caching and incremental check pointing which include storing all the updates since the last disk write in a buffer, and flushing them to disk at a later time. However, these solutions simply delay the same number of physical writes to disk and do not change the concept of a single disk access per data block. A solution is needed that reduces or eliminates the disk access bottleneck described above while still fitting into a classical database framework including transaction management, recovery management, and database query ability.

In one embodiment a method of writing to a disk includes receiving a plurality of updates to an object, identifying an area of contiguous free space in the object, placing the plurality of updates in the area of contiguous free space in the object, and updating the disk with the plurality of contiguous updates in one disk access.

In another embodiment, a method of writing to disk may include receiving an update to a data block of an object, appending the updated data block to the end of an object memory, repeating the appending until there are a plurality of contiguous updates at the end of the object memory, and updating the disk with the plurality of contiguous updates in one disk access.

BRIEF DESCRIPTION OF THE DRAWINGS

FIG. 1A is a representation of the framework overview.

FIG. 1B is a representation of one embodiment of writing to a disk.

DETAILED DESCRIPTION OF INVENTION

Figure 1C:
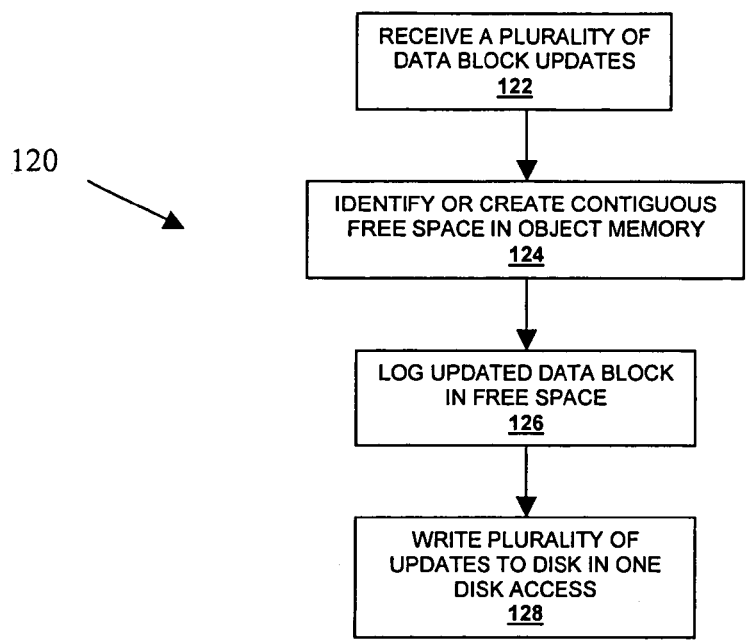
FIG. 1C is a representation of another embodiment of writing to a disk.

The technology to perform a single disk access has not advanced at the same rate as other computer technologies. Each update to a data block requires a separate disk access. As such, disk access is a bottleneck in computing processes, preventing realization of other technological advances. This disclosure illustrates a way to combine the updates for a database object such that multiple updates are accomplished with a single disk access, thus reducing the total number of disk accesses required, and how the updates fit in with common database algorithms of transactional management, recovery management and database query ability FIG. 1A illustrates an overview of the environment including logical object 10 and external elements 20-95. Each of these elements is introduced here and will be explained in greater detail in the sections throughout the disclosure. Logical object 10 includes memory made up of a plurality of extents. In this example, object 10 has extents 11-13. Each object has an object id. Each extent includes a metadata block and an array of contiguous data blocks.

Writer 20 writes the data blocks in the buffer cache to the disk. When an update to a data block in an object occurs, that update is not immediately saved to the physical disk as this would be very time consuming. That data block is placed in a cache to be written to disk at a later point in time and can be referred to as a "dirty" data block. Writer 20 flushes dirty blocks from the cache to the disk. This flushing process is sometimes referred to as check pointing.

Object defragmenter 30 performs defragmentation of object memory. The memory used by an object can become fragmented as a result of data block updates that are performed "out-of-place." Out-of-place updates are further described in the Physical And Logical Relative Addressing section of this disclosure. The object defragmenter defragments object memory on-line.

Scan algorithms 40 retrieve data. When a query is received, the data requested is retrieved. Scan algorithms 40 use either the extent map or indexes to retrieve the requested data.

Occasionally, a database will fail. Recovery management 50 recovers data block edits that were made and placed in the cache but that have not been flushed to disk. Recovery management uses redo log 80.

Transaction management 60 provides a mechanism to consistently read and recover the latest data values. Even though updates have not been flushed to disk, a query should retrieve the updated data values. Transaction management 60 reads and recovers the most up to date data values from undo records 70 whether they are flushed to disk or not.

Stale index 90 include information regarding the stale data blocks. A stale data block is the result of an "out-of-place" update. Out-of-place updates are further described in the Physical And Logical Relative Addressing section of this disclosure.

Overview

FIG. 1B illustrates process 100, an embodiment of using log structures database objects for improved disk writes. This embodiment performs an "out-of-place" update by appending the updated data blocks to the contiguous free space at the end of the object memory as if the memory were a log file, so that the updates are adjacent to each other. More specifically, process action 102 receives an update to a data block. Process action 104 logs the update to the available contiguous space at the end of the object memory or extent file. Process action 106 determines if a plurality of updates exist in the contiguous space at the end of the extents. If a plurality of updates do not exist in the contiguous space, process 100 returns to process action 102 to receive more updates. If process action 106 determines that there are a plurality of contiguous updates, then process action 108 writes the plurality of updates to disk in one disk access.

In another embodiment the contiguous free space must be located and coalesced within the object memory. Once located it can be coalesced to contiguously store updated data blocks. Process 120 in FIG. 1C illustrates the use of coalesced memory for writing contiguous data block updated. Process action 122 receives a plurality of data block updates. Process action 124 identifies or creates contiguous free space in the object memory. The updated data blocks are logged into the identified contiguous free space in process action 126. Process action 128 writes the plurality of updates to disk in one disk access.

The mechanisms and processes used to accomplish multiple updates in one disk access are explained below.

Relative Addressing

Figure 1D:
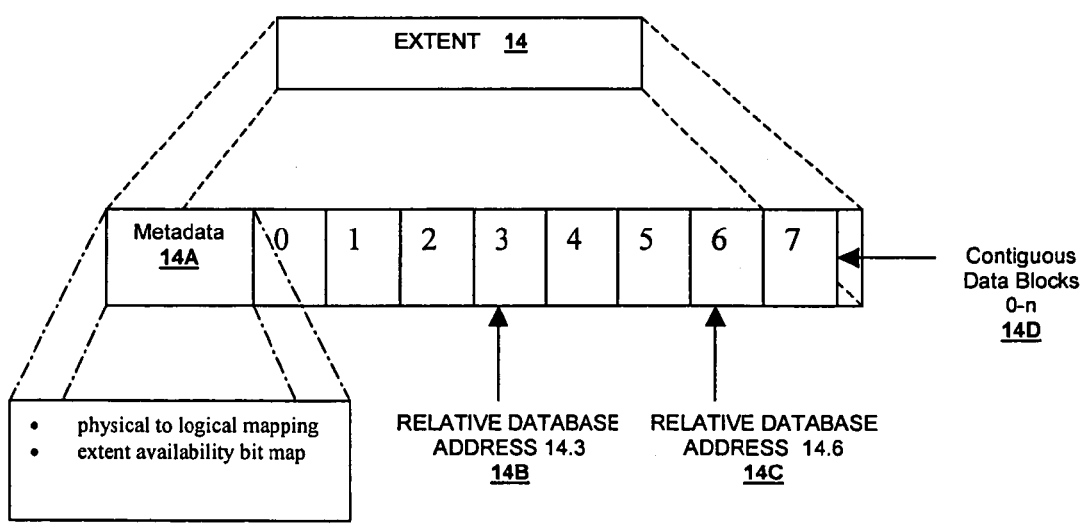
FIG. 1D is a representation of an embodiment of an extent.

Object data blocks are identified using a relative addressing scheme. FIG. 1D illustrates one embodiment of relative addressing. Extents 14 holds metadata blocks and data blocks. For example, extent 14, includes metadata block 14A and contiguous data blocks 14D. Metadata 14A holds the physical to logical mapping information which will be explained in later sections of this disclosure, and the extent availability bit map which details the data blocks that are available to accept data. Note that only 7 data blocks are shown in FIG. 1D for simplicity, however, this example is not meant to limit the embodiments herein. Each data block can be identified by a relative database address, or an RDBA that indicates the data block's relative positioning in the object. For example, the RDBA of element 14B in FIG. 1B can be represented by relative database address 14.3, indicating that the data block is block number 3 of extent 14. Element 14C in FIG. 1B shows RDBA 14.6 for data block number 6 of extent 14.

Physical and Logical Relative Addressing

Figure 1E:
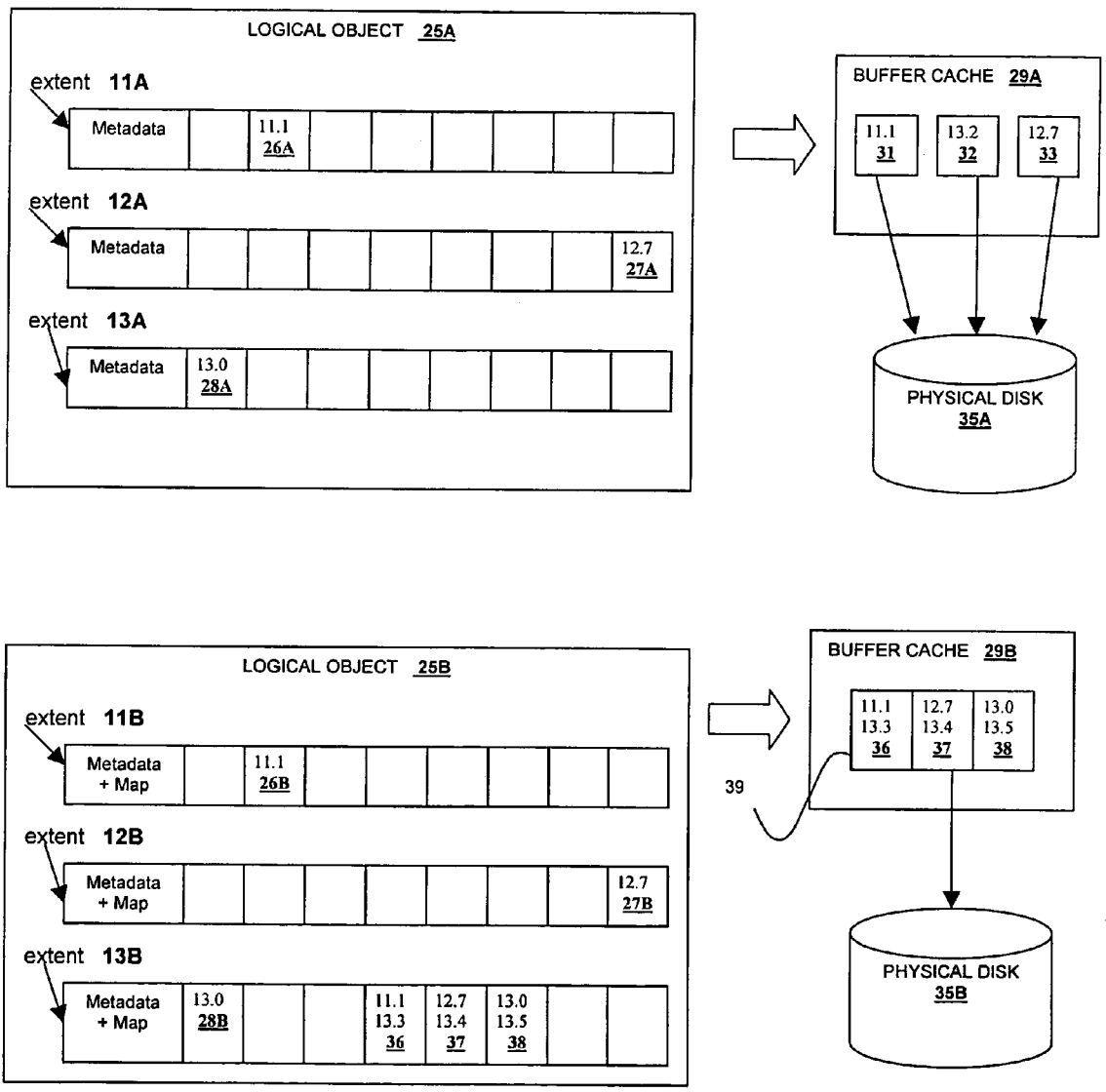
FIG. 1E is a representation of physical and logical relative database addressing and log based structures.

FIG. 1E illustrates the differences between the traditional method of disk writing and the embodiments herein, and introduces the concept of physical and logical relative database addressing.

Logical object 25A has extents 11A, 12A, and 13A. The extents have metadata blocks and data blocks. The blocks are addressed in a relative addressing scheme as described earlier such that data block 26A has an RDBA of 11.1 indicating that it is block number 1 of extent 11. As data blocks 26A, 27A and 28A are updated, the data blocks are individually copied into buffer cache 29A as dirty blocks 31-33. At a later point, data blocks 31-33 are individually flushed to disk 35A in a write process. This process is referred to as "in-place" writes as the data block is updated in its physical location. The individual nature of the flushing process causes a bottleneck to be formed in systems with a fair amount of updates. An improved method of writing to disk is described in the following paragraph.

This portion of FIG. 1E is described in conjunction with FIG. 1B. Logical object 25B has extents 11B, 12B, and 13B. As the data blocks in logical object 25B are updated, they can be appended to the end of the extents where there is available contiguous space. The data blocks are appended as if the extent was a log structure. For example, data blocks 26B, 27B and 28B all receive updates as in process action 102 of FIG. 1B. The updated blocks are logged to contiguous available space at the end of the used space in extent 13 and become blocks 36-38 as in process action 104 in FIG. 1B. This process is referred to as "out-of-place" writes as the updates are made in a place other than the location of the block. The single RDBA of these data blocks is no longer sufficient to identify the blocks. These moved data blocks now have two types of relative addressing—logical and physical.

The Logical RDBA is the address that is first assigned to the data block by the space layer. For example, data block 26B has a logical RDBA of 11.1. It is the physical address at which the data block originated, but not the physical address of its final destination. The Physical RDBA is the address assigned to the data block on each subsequent update. For example, data block 26B upon an update is moved to contiguous free space in extent 13 and becomes data block 36 with a logical address of 11.1 to indicate the origin of the data and a physical address of 13.3 to indicate the physical location of the information.

Recall that data blocks 26B-28B in FIG. 1C are moved to extent 13 and become contiguous data blocks 36-38 in process action 104 of FIG. 1B. This set of contiguous data blocks is sent to buffer cache 29B as one entity 39. This single entity is flushed to disk 35B in a single disk access (as in process action 108 in FIG. 1B) which significantly reduces the number of times the disk is accessed.

The buffer cache has a checkpointer queue. Every buffer on which a change has been made gets inserted into the checkpointer queue. In this framework, the queue is hashed or indexed on the object id. During a write, the checkpoint queue is flushed by object id. For every object, the data blocks residing in the queue are made contiguous (that is located at the same point in the framework) by the writer and then the writer issues a single write request for these contiguous data blocks. These are contiguous addresses in disk, therefore only a single rotation and seek of the disk address is required to write these blocks.

Note that the Physical RDBA is equal to the Logical RDBA when originated, and changes as and when the data block is written to disk. Each Physical RDBA is mapped to its corresponding Logical RDBA in the metadata for each extent. Also in the metadata for each extent, is the data block bitmap indicating the availability of data blocks within the extent. For example, the data block bit map can indicate the state of each data block.

The life cycle of a data block in the framework includes the following states indicated in the data block bitmap. When a block is first allocated to the object, it is marked "free to coalesce." When rows are inserted in the block, it is marked "non-stale." When the block is rewritten out-of-place on disk at a separate location, the original block is marked as "stale." The defragmenter process marks the block back to "free to coalesce."

In addition to the data block bitmap indicating a stale state, the system also tracks these stale data blocks in a "stale index" in memory. The stale index is used by other processes in the system so that they may have access to the information.

Writer

Figure 2A:
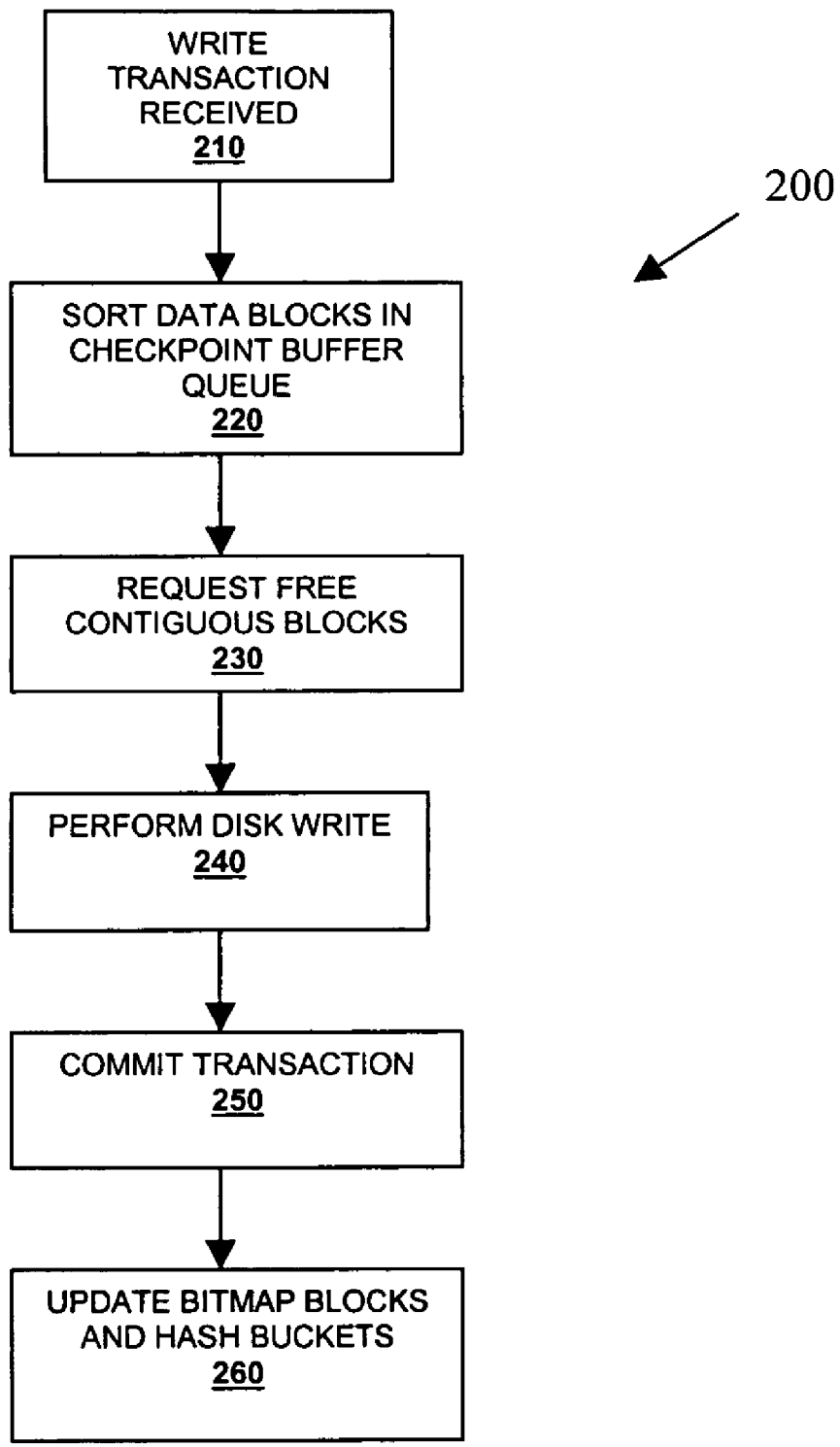
FIG. 2A is a representation of process 200, the writer algorithm.

A writer algorithm accumulates all object specific dirty buffers from the buffer cache, requests contiguous space in the object, and flushes the buffers. Process 200 in FIG. 2A, and process 249 in FIG. 2B illustrate an embodiment of the writer algorithm in more detail.

In process action 210 a write transaction is initiated for an object. The data blocks are hashed or sorted in process action 220 according to the object id. Each hash bucket consists of a linked list of current dirty buffers belonging to individual objects. Contiguous free space is requested from the space management layer in process action 230. The space management layer searches each extent in the object and locates ranges of blocks that are available as shown in more detail in process 239 of FIG. 2C. The disk write is performed in process action 240. The write transaction is committed in process action 250. On commit, the data block bitmap block and stale index are updated in process action 260; the bitmap blocks associated with the physical RDBAs are updated by marking the appropriate bits to indicate "free to coalesce"; and the stale index is updated atomically. If for some system fault the write aborts, then updates on all the structures mentioned below will be rolled back to their previous images before the write took place. The writer will then retry the write transaction.

Figure 2B:
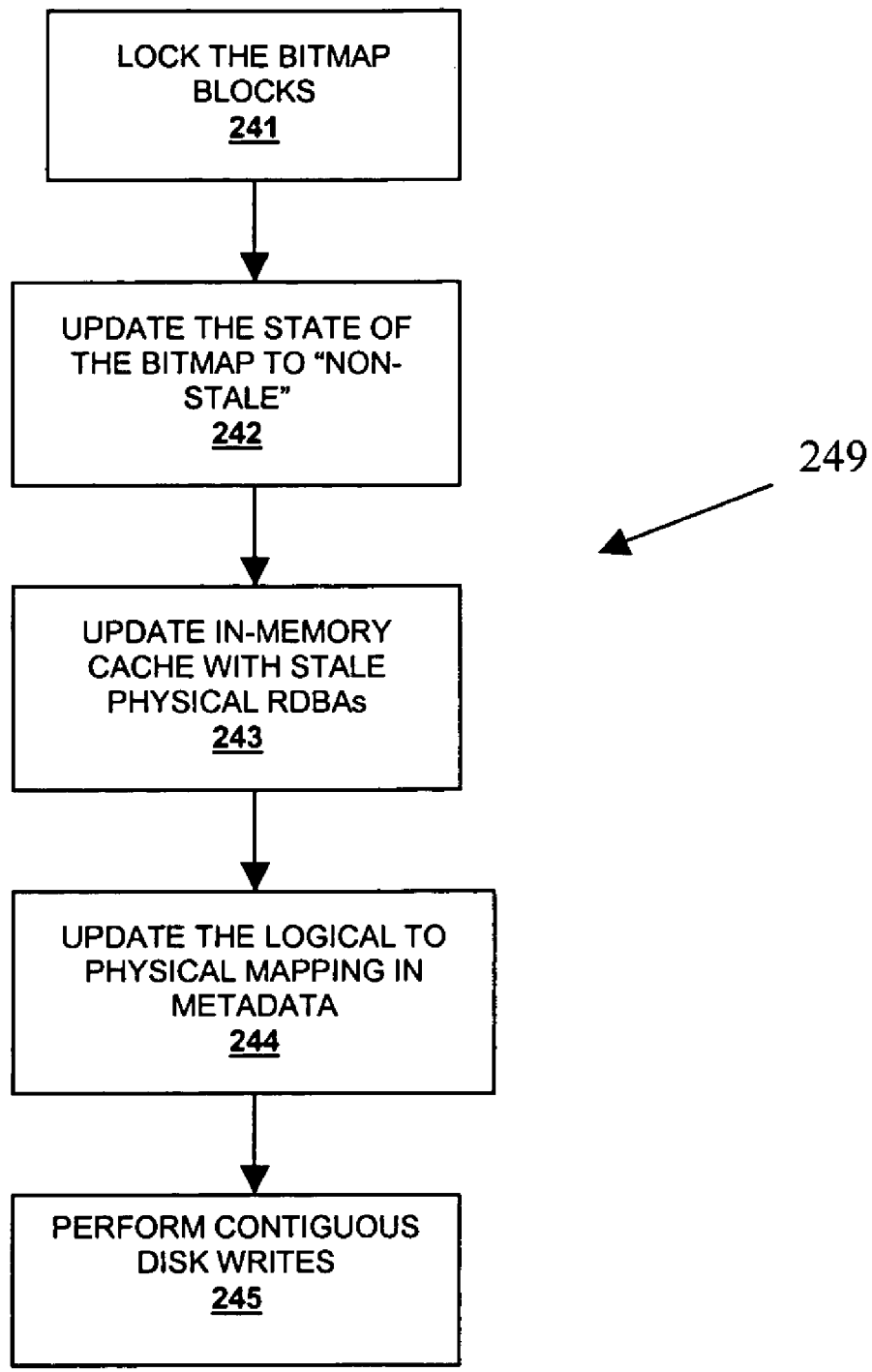
FIG. 2B is a representation of process 249, the write process.

Process action 240, the disk write, is explained in more detail in process 249 in FIG. 2B. Recall that process 200 requests free space in process action 230 and then performs the disk write in process action 240. The bitmaps of the blocks returned by the space management layer in process action 230, are locked in process action 241. The state of the bitmaps is updated from "free to coalesce" to "non-stale" in process action 242. The physical RDBAs that became stale are updated in the stale index in process action 243. The logical to physical mapping of the RDBAs in the extent metadata is updated in process action 244. The contiguous disk writes are performed in process action 245.

Figure 2C:
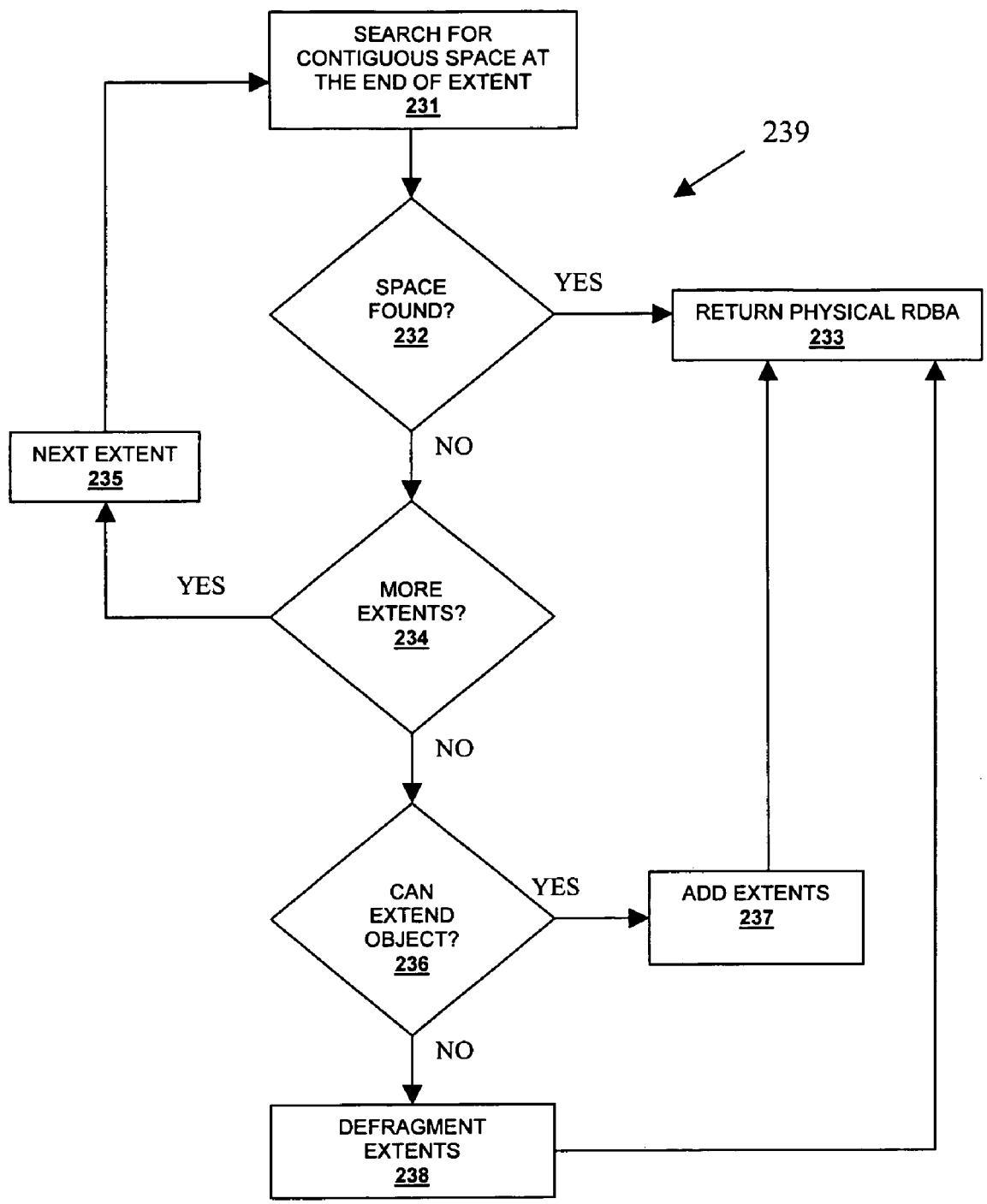
FIG. 2C is a representation of process 239.

Process action 230, the request for free contiguous block is explained in more detail in process 239 in FIG. 2C. Process action 231 searches for contiguous space at the end of the extent in which the updated block exists. Process action 232 determines if contiguous space has been found. If contiguous space has been found, process action 233 returns the physical RDBA of the found space. If space is not available at the end of the current extent, process 234 determines if there are more extents in the object. If there are more extents, process action 235 jumps to the next extent and process 239 returns to process action 231 to search for contiguous space. If it is determined in process action 234 that there are no more extents to search, process action 236 determines if the object memory can be extended, that is, can additional extents be added. If additional extents can be added, process action 237 adds extents to the object, and the physical RDBA is returned in process action 233. If process action 236 determines that the object memory cannot be extended, then process action 238 triggers the object defragmenter to compact the used data blocks in the existing extents to provide contiguous free space. The physical RDBA in the defragmented, or compacted, extents is returned in process action 233.

In some embodiments, determining whether to extend the object memory or defragment the object is driven by an optimizer fiction. The optimizer function balances the frequency of object defragmentation with the object growth trends. The optimizer algorithm, in some embodiments, functions as follows. Whenever an object is extended, the statistics can be maintained in a Automatic Workload Repository. If the rate of growth of the object exceeds the average rate of growth of all other objects by a standard deviation, then the defragmenter can be invoked to generate coalesced free space. Using the statistics, the defragmenter can generate free space to consume for the next time interval in which it will be invoked again. This process works inversely with the defragmentation frequency.

Object Defragmenter

Recall that updated data blocks as shown in FIG. 1C are moved to the end of the extents. This creates a number of stale data blocks throughout an object and uses up the free space at the end. To manage space requirements, in some embodiments, the object memory can be extended. In other embodiments the existing extents of an object can be cleaned or defragmented. The object defragmenter provides for on-line reorganization of stale space. The reorganization compacts a portion of the object memory to generate contiguous free space for future updates.

Figure 3A:
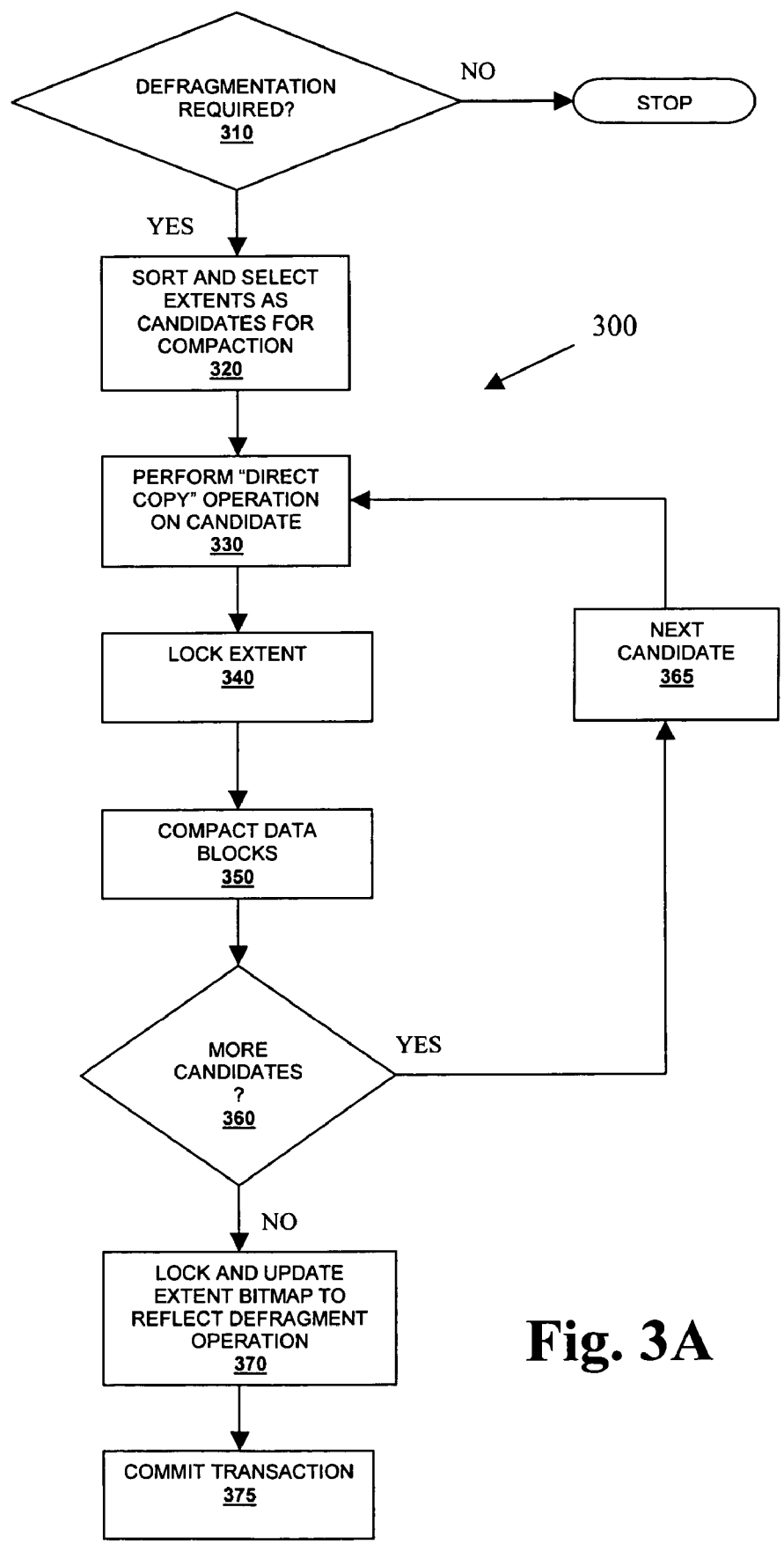
FIG. 3A is a representation of process 300, the object defragmenter algorithm.
Figure 3B:
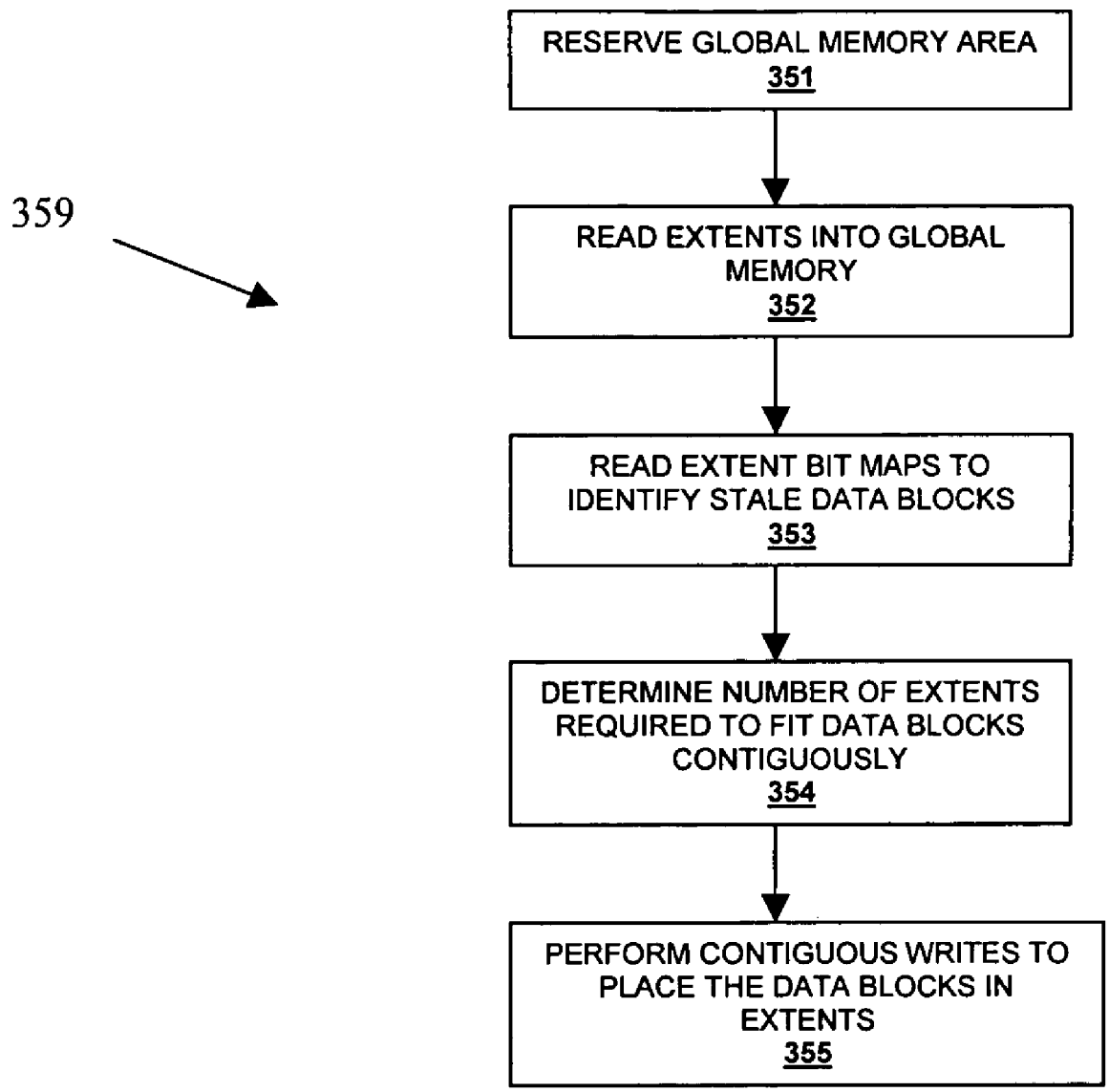
FIG. 3B is a representation of process 3500, the compaction process.
Figure 3C:
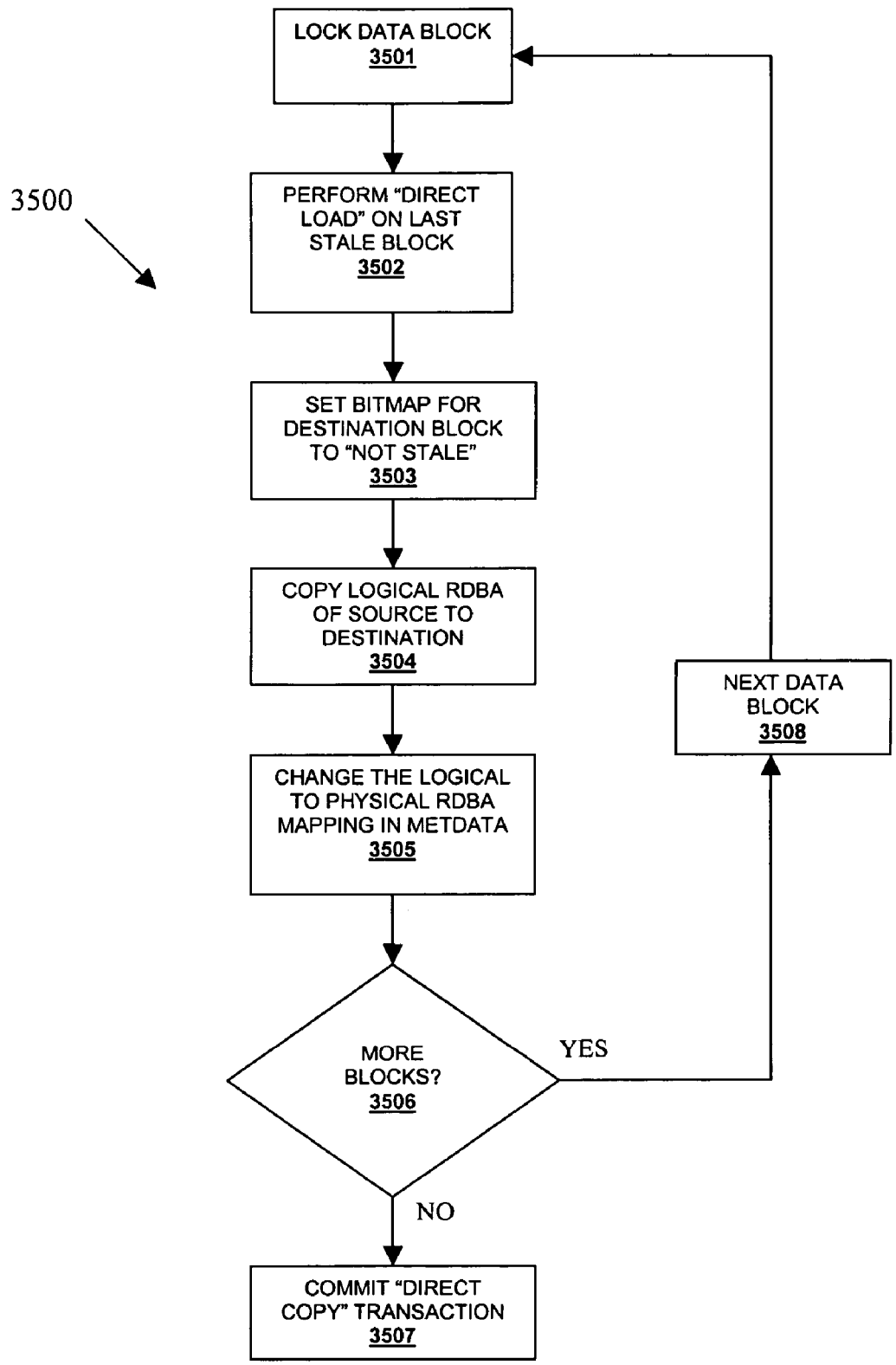
FIG. 3C is a representation of process 359, the block defragmentation process.

FIG. 3A-3C illustrate an embodiment of the object defragmenter algorithm. Process action 310 determines if defragmentation is required. This determination involves at least three statistics. The object defragmenter is triggered: if the number of blocks coalesced during the previous write was above a threshold, if the rate of flushing to disk during check pointing is above a threshold, or if the maximum contiguous data blocks marked "free to coalesce" fall below a threshold. If it is determined that defragmentation is not required, process 300 stops. If it is determined that defragmentation is required, process action 320 sorts the extents and selects candidates for compaction from the set. The extents are sorted by two criteria: amount of stale space and by amount of "buffer gets." The higher the amount of stale space the more likely the extent will be chosen as a compaction candidate. The lower the amount of "buffer gets" the more likely the extent is to be chosen as a compaction candidate.

Process action 330 performs a "direct copy." Direct copy is a single change of a block where the entire block is copied over. There is only one redo (change) record for the block operation of the first candidate. The extent of the candidate is locked in process action 340. The data blocks are compacted in process action 350. This process is explained in more detail in process 359 in FIG. 3B. Process action 360 determines if there are more candidates. If yes, then process 365 goes to the next candidate and returns process 300 to process action 330. If there are no more candidates, process action 370 locks the extent bitmaps and updates them to "free to coalesce" so that they can be used by the write algorithm. The defragmentation transaction is committed in process action 375.

Compaction moves data blocks so that they are compacted in one portion of the extent leaving the remainder of the extent free. In one embodiment, a "least recently used" cleaning algorithm is used. Process 359 in FIG. 3B illustrates this cleaning process. Global memory is reserved in process action 351. The data blocks are copied into the global memory in process action 352. The stale blocks are identified in process action 353. The number of extents required to fit the data blocks are determined in process action 354. Contiguous writes are performed using the determined number of extents in process action 355.

More details of the compaction process is illustrated in process 3500 shown in FIG. 3C. The data block is locked in process action 3501. A direct load is performed on the last stale block in process action 3502. The bit map for the destination block is set to "not stale" in process action 3503. The Logical RDBA of the source is copied to the destination in process action 3504. The metadata of the destination extent is updated to reflect the new logical to Physical RDBA mapping in process action 3505. Process action 3506 determines if there are more data blocks to be defragmented. If process action 3506 determines that there are more blocks to be defragmented, the next block is obtained in process action 3508 and process 3500 is returned back to process action 3501. If process action 3506 determines that there are no more data blocks that need to be defragmented, then the "direct copy" transaction is committed in process action 3507.

Concurrent Operations

During defragmenter operations other operations are occurring. For example, data block updates and query retrievals are happening simultaneously. Concurrent conventional inserts provide a mechanism to allow data block updates during defragmenter operations. Concurrent sequential scans provide a mechanism to allow query retrievals during defragmenter operations.

Figure 4A:
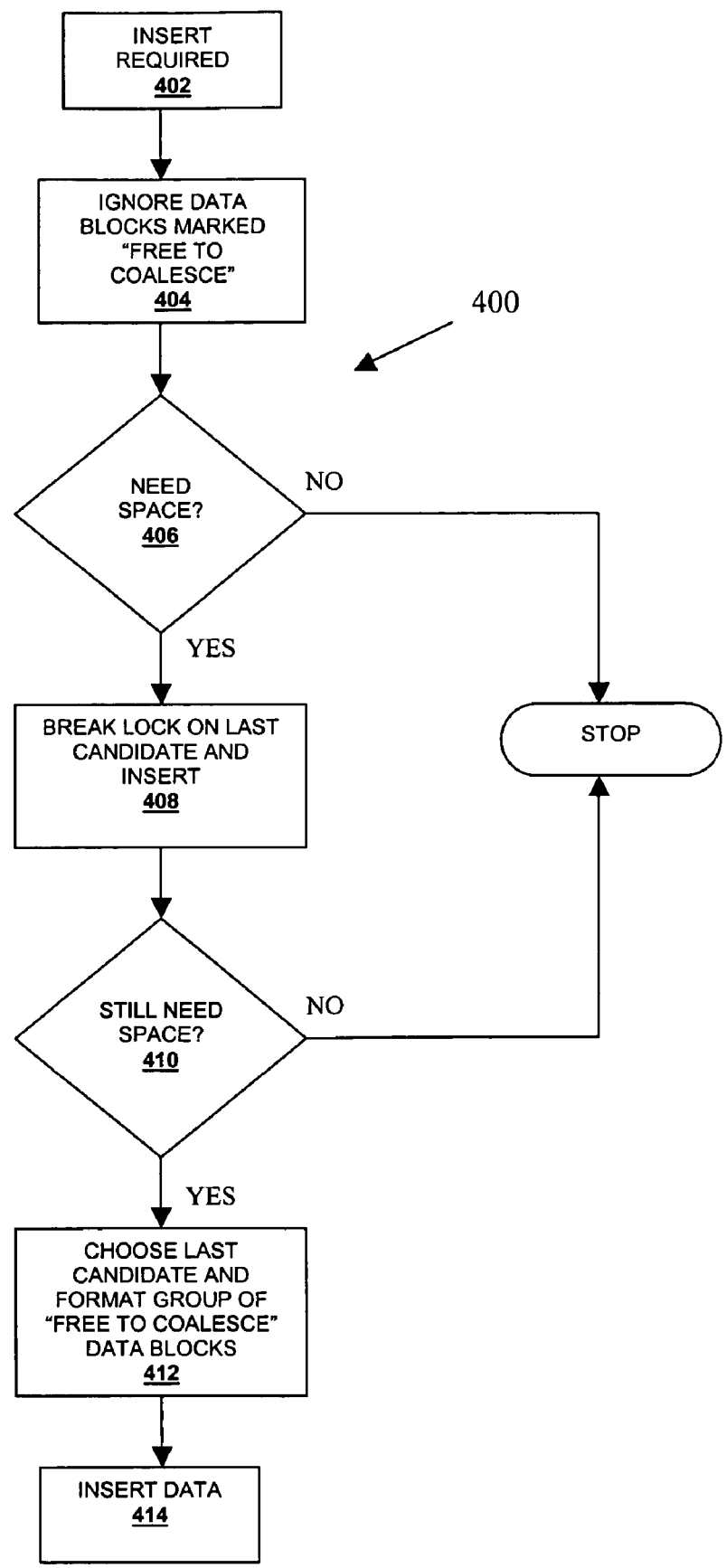
FIG. 4A is a representation of process 400, the concurrent conventional insert algorithm.

Concurrent conventional inserts are described by process 400 in FIG. 4A. An insert is required in process action 402. The space in the extent is searched while the data blocks marked "free to coalesce" are ignored in process action 404. Any other data blocks are candidates for insertion. During object defragmentation, locks held on the extent map (as in process action 370 in FIG. 3A) will prevent insertions into any newly created free space. However, the insert algorithm can override this lock if enough space pressure exists. Process action 406 determines if more space is required. If process action 406 determines that more space is not required, then process 400 stops. If process action 406 determines that more space is required, then process action 408 breaks the lock on the last candidate and inserts the data. Process action 410 determines if even more space is required. If even more space if not required, process 400 stops. If process action 410 determines that more space is required, then process action 412 chooses the last candidate and formats a group of data blocks that are marked "free to coalesce." Process action 414 inserts data into the formatted data blocks.

Figure 4B:
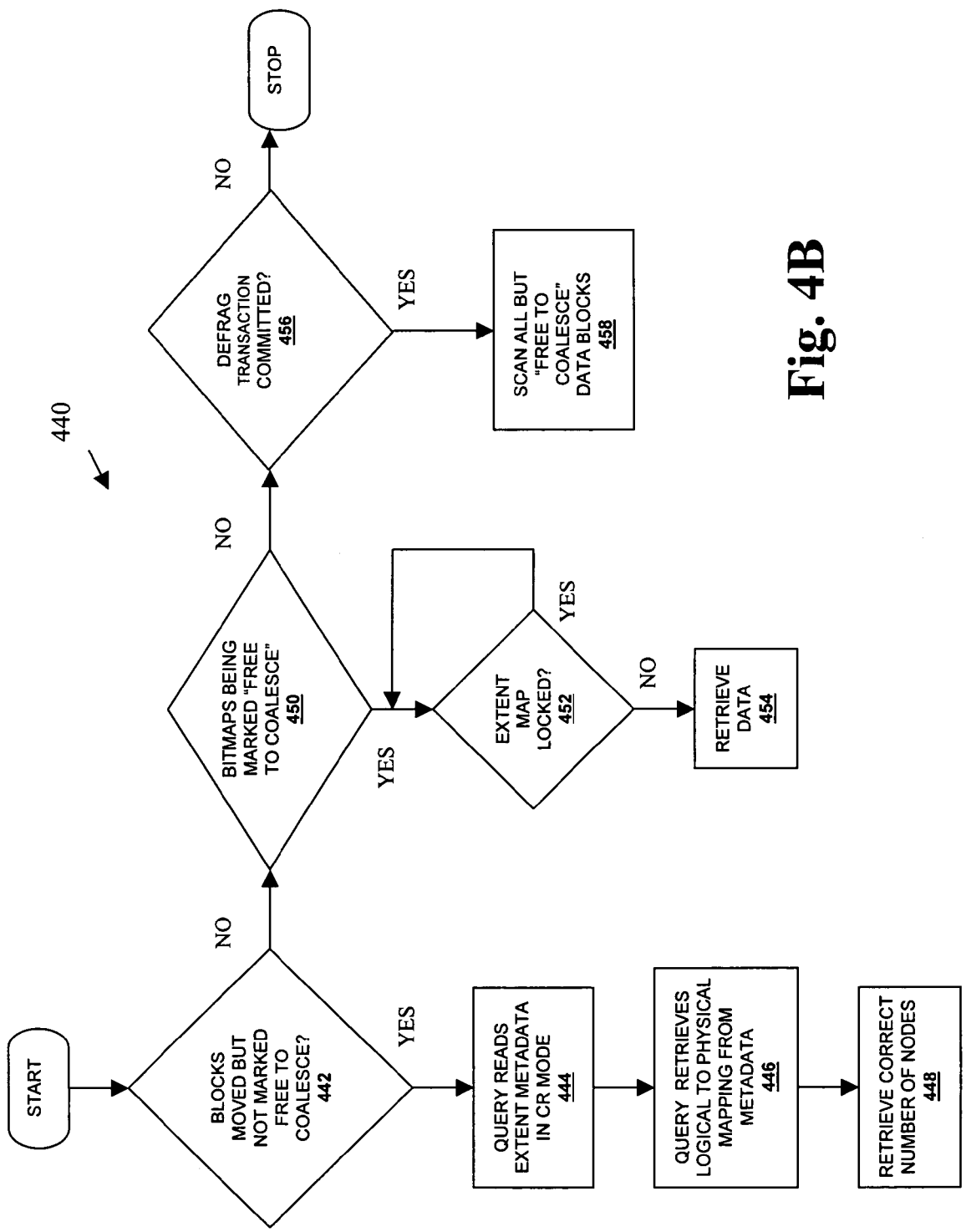
FIG. 4B is a representation of process 440, concurrent sequential scan methods during the object defragment operation.

Queries during defragmentation are referred to as concurrent sequential scans. One embodiment for current sequential scans is shown in process 440 in FIG. 4B. There are three scenarios for which sequential scans are permitted during defragmenter operations. These three scenarios are details below. Process action 442 determines if data blocks have moved but have not been marked "free to coalesce." If process action 422 is true, the query reads the extent metadata in current mode in process action 444. The query retrieves the logical to physical mapping from the extent metadata in process action 446. The logical to physical mapping will determine correctly which data blocks to look into. Since the blocks are still not marked "free to coalesce" the logical to physical mapping will point to these blocks and therefore correctly retrieve the data. Using the information obtained from the metadata, process action 448 retrieves the data.

Recall that process action 442 determines if the data blocks moved but are not marked "free to coalesce". If process action 442 is not true, then process action 450 determines if the bitmaps of the data blocks are currently being marked "free to coalesce." If the bitmaps are currently being marked, then process action 452 determines if the extent map is locked. If the extent map is not locked, process action 454 retrieves the data. If the extent map is locked, process 440 loops back to process action 452 to wait for the extent map to unlock.

If process action 450 determines that that the bitmaps are not currently being marked "free to coalesce," then process action 456 determines if the defragment transaction has been committed. If the defragment transaction has been committed, process action 458 scans all data blocks but those marked "free to coalesce." If the defragment transaction has not been committed in process action 456, the process stops.

Scan Algorithms

In the embodiments herein the updates are done "out-of-place" resulting in a physical RDBA and a logical RDBA for the data block. The logical and physical RDBAs of each data block require changes to the index-based and full-table-based scan algorithms.

Figure 5A:
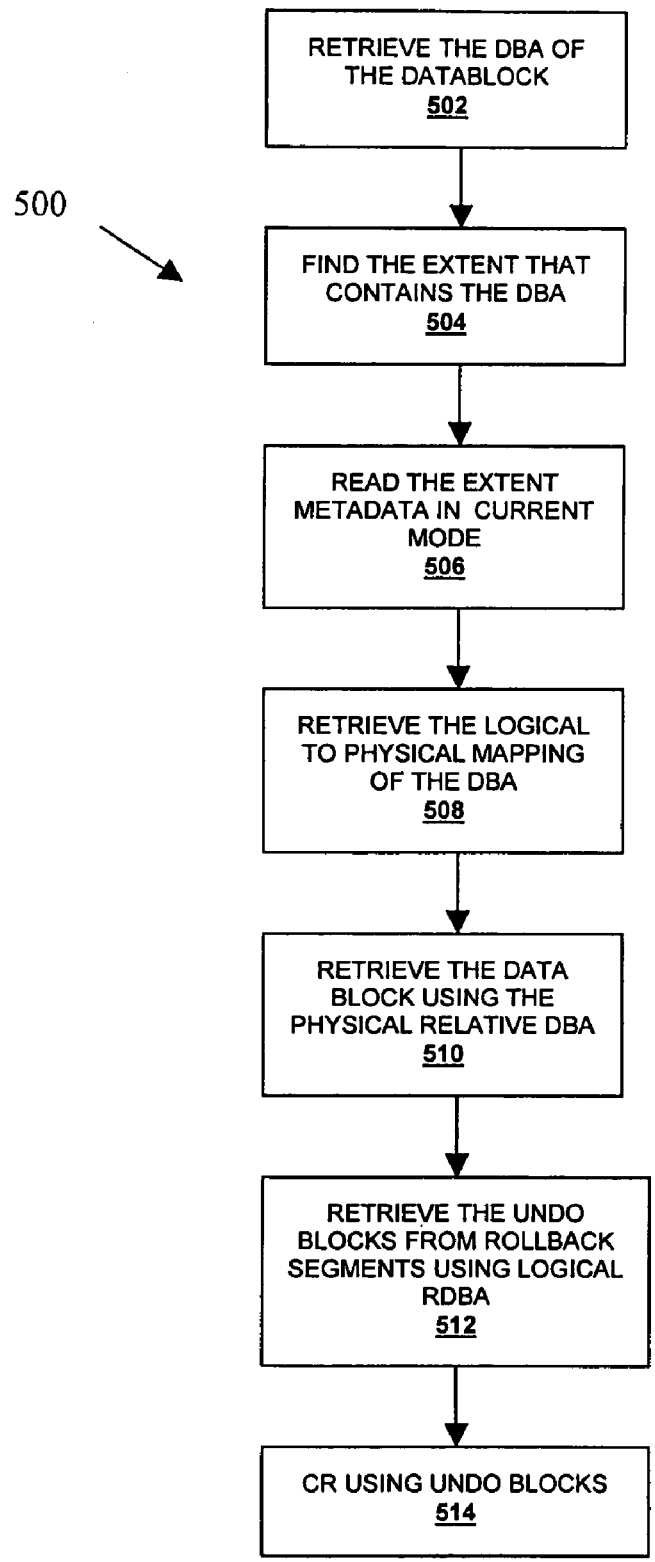
FIG. 5A is a representation of process 500, the index-based query handling process.

An index-based scan refers to an index prior to retrieving data. Process 500 in FIG. 5A illustrates an embodiment of the index-based scan algorithm. Process action 502 retrieves the RDBA of the data block based on the rowid in the leaf block. The extent that corresponds to the RDBA is located in process action 504. The extent metadata is read in current mode in process action 506. The logical to physical mapping is retrieved in process action 508. The data block is retrieved based on the Physical RDBA in process action 510. The undo blocks are retrieved from the rollback segments using the Logical RDBA in process action 512. A consistent read (CR) is applied in process action 514.

Figure 5B:
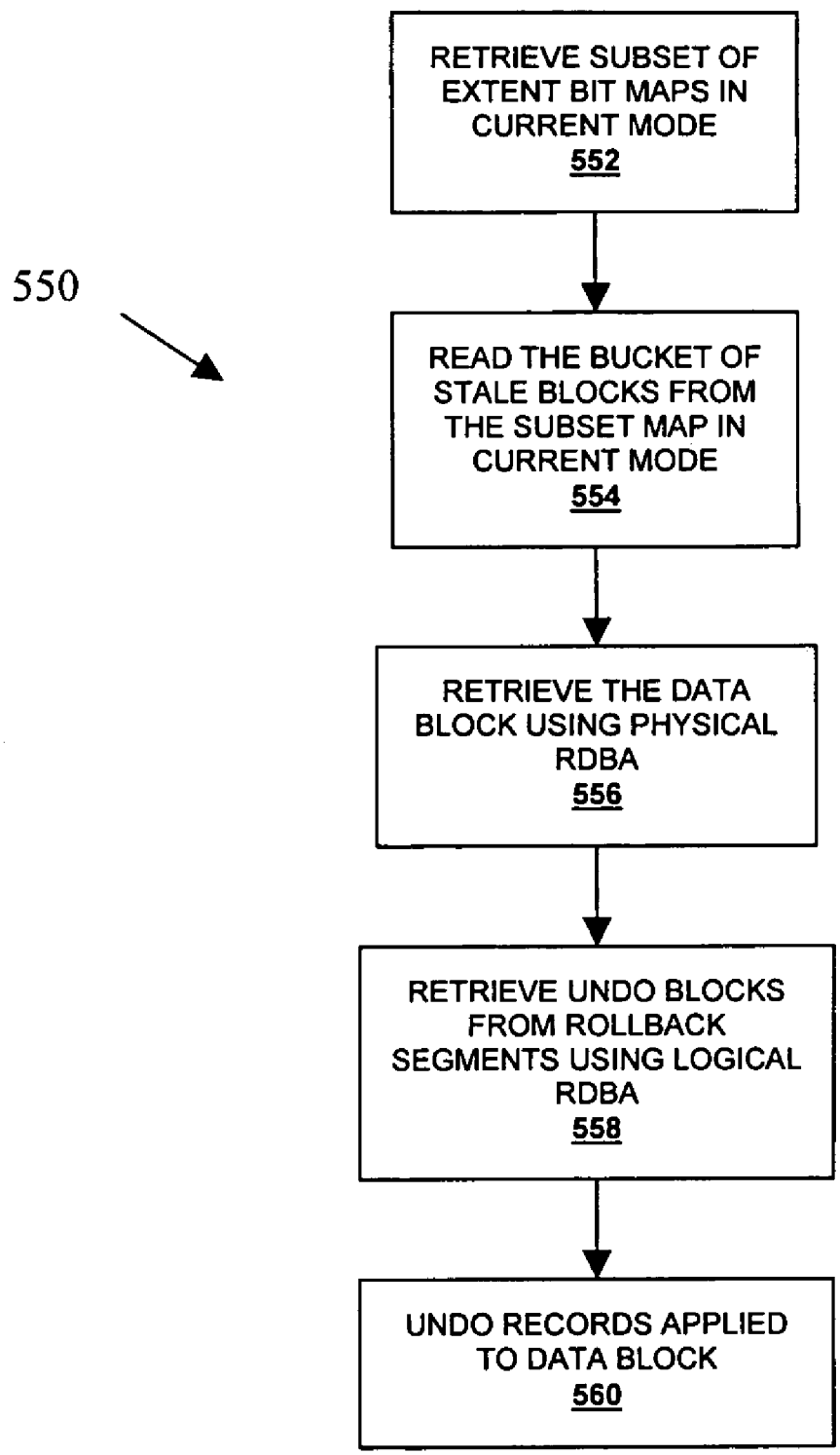
FIG. 5B is a representation of process 550, the full table based query handling process.

Process 550 in FIG. 5B illustrates an embodiment of the full-table-based scan algorithm. The subset of extent maps are retrieved in current mode in process action 552. The stale blocks from the subset map are read in current mode in process action 554. The data block is retrieved using the physical RDBA in process action 556. The undo blocks from the rollback segments are retrieved using the logical RDBA contained in the data block in process action 558. The undo records corresponding to the logical RDBA are applied to the data block to bring it in a consistent state with respect to the time at which the query was invoked in process action 560.

In some embodiments, whenever a query is issued, the results should be consistent to the time at which the query was performed. Other transactions that modify data blocks make the blocks inconsistent with respect to the time of the query. The timestamp of the query issue is called scan (SCN). Therefore, during the query, undo is applied to data blocks to bring them to a consistent state with respect to the scan (SCN). Performing CR using undo records associated with the Logical RDBA results in consistency of the data block with respect to SCN.

In some embodiments the CR process functions as follows: if a datablock undergoes any insert/update or delete, the previous version of the data is stored as undo records corresponding to the address of the data block. To retrieve query results from a database object, the query optimizer can either recommend a full-table-scan or an index-based scan. In full table scan, extent maps in database objects are read to get the address of the data blocks that have data. In index-based scans, the addresses are retrieved from the index. In some embodiments, the addresses from the extent map or the index are treated as logical RDBAs, as they do not change during the contiguous relocation of data blocks on disk. If the data block is already in the cache, then undo records corresponding to the logical RDBA will be applied to the data block to bring the data block to an image that is consistent to the time of the query. If the data block is to be read from disk, the physical address of the data block is retrieved, the block is read from the physical address and the logical RDBA is retrieved from the block. Undo records corresponding to the logical RDBA are then applied serially in a backward going fashion to match the consistent state of the query in the data block.

Recovery Management

Figure 6:
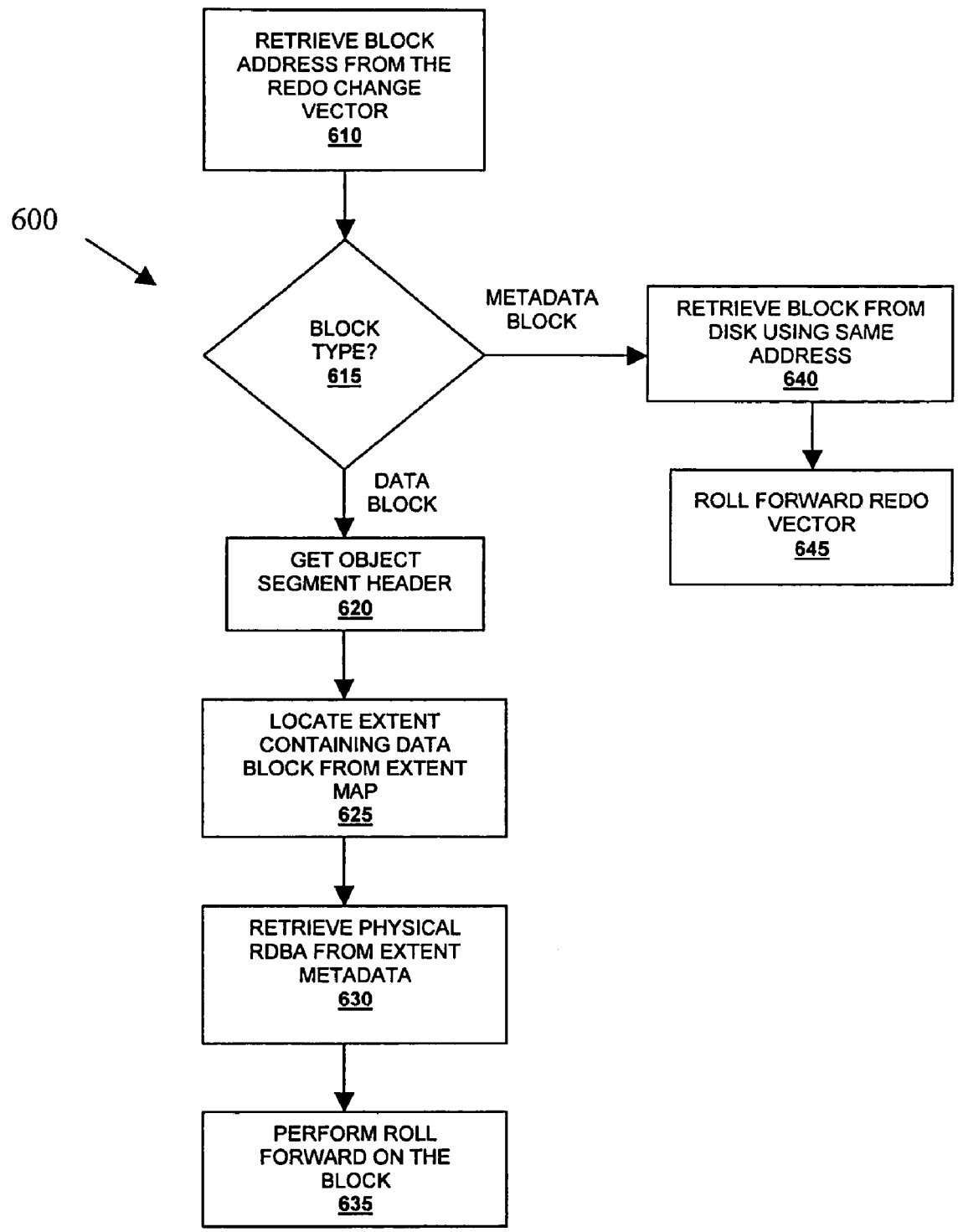
FIG. 6 is a representation of process 600, the recovery management process.

In instances when the database goes down prior to check pointing, the disk does not yet possess these changes. The changes must be recovered and written to disk. Process 600 in FIG. 6 illustrates an embodiment of the recovery management process. Process action 610 retrieves the block address from the redo change vector. Process action 615 determines what type of block is being recovered: metadata or data. If the block type is metadata, process action 640 retrieves the block from disk using the address retrieved from the change vector in process action 610. A roll forward is performed on the redo log in process action 645.

If process action 615 determines that the block type is data, the object header is obtained in process action 620. The extent containing the data block is located from the extent map in process action 625. The physical RDBA is retrieved from the extent metadata in process action 630. A roll forward is performed on the block in process action 635. The roll forward is a process where the redo records for forward going changes on a specific data block are applied to the block to bring it from an earlier timestamp to a later timestamp. In this framework, using the Physical RDBA, the data block is retrieved. Using the Logical RDBA in the data block header, the redo records are identified and the roll forward mechanism is applied.

Transaction Management

Figure 7:
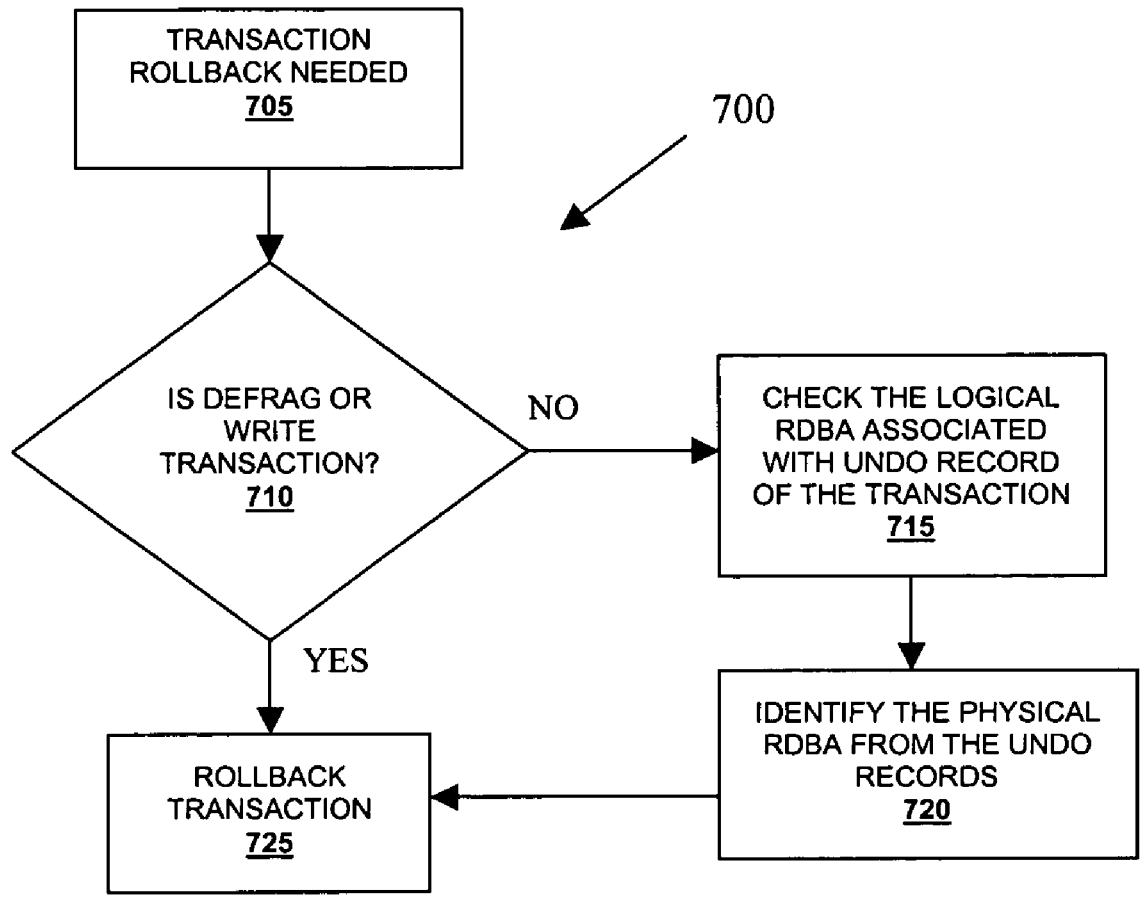
FIG. 7 is a representation of process 700, the transaction management process.

Relational objects are transactionally managed in order to perform consistent reads and recovery from dead uncommitted transactions. Process 700 in FIG. 7 shows an embodiment of the transaction management process. Process action 705 is notified that transaction rollback is required. Process action 710 determines if the transaction is a defragmentation transaction or a write transaction. If the transaction is either a defragmentation or a write, process action 725 rollsback the transaction. If the transaction is neither a defragmentation nor a write, process action 715 checks the Logical RDBA associated with the undo record of the transaction. Process action 720 identifies the Physical RDBA from the undo records. Process action 725 rolls back the transaction.

In some embodiments, the rollback procedure is performed as follows. For consistent reads, when the current data block is read, the transaction header contains the transaction ids of all transactions active on the data block. The undo records are looked up in the transaction table, which points to the undo blocks present in rollback segments for the transaction. The undo records corresponding to the Logical RBDA present in the data block are applied on the data block. For transaction recovery, the following is performed. The bitmap blocks and the stale indexes are rolled back using their undo records. Then the data blocks are rolled back using the undo records.

System Architecture Overview

Figure 8:
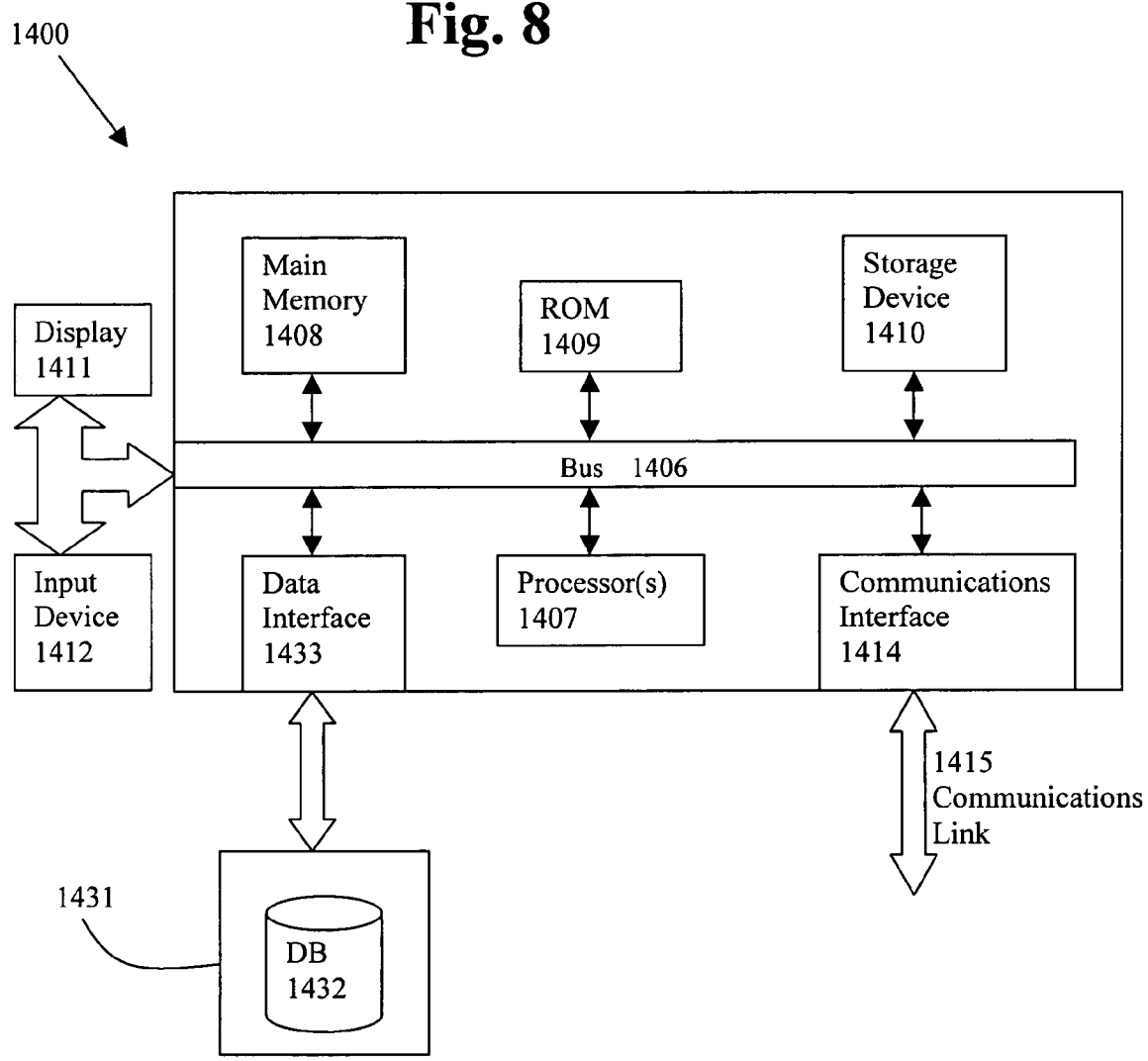
FIG. 8 is a representation of a system 1400 that can provide log structured relational database objects.

The execution of the sequences of instructions required to practice the invention may be performed in embodiments of the invention by a computer system 1400 as shown in FIG. 8. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 8, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A method of writing to disk, the method comprising:
   a) receiving an update to a data block;
   b) appending the updated data block to the end of an extent;
   c) repeating a) and b) until there are a plurality of contiguous updates at the end of the extent; and
   d) updating the disk with the plurality of contiguous updates in no more than one disk access.

2. The method of claim 1, wherein appending comprises:
   locating contiguous free space in a file of extents;
   placing the updated data block in the contiguous free space.

3. The method of claim 1, wherein appending comprises:
   searching for contiguous free space in a file of extents;
   finding no contiguous free space in the file of extents;
   adding new extents to the file of extents;
   placing the updated data block in the added extents.

4. The method of claim 1, wherein the updated data block has an address indicating the origin of the data block and an address indicating the appended location of the data block.

5. The method of claim 1, wherein data inserts are occurring concurrently with the disk updates.

6. The method of claim 1, whereon sequential scans are occurring concurrently with the disk updates.

7. The method of claim 1, wherein index scans are occurring concurrently with the disk updates.

8. The method of claim 1, wherein the data block updates updates are recovered prior to their being written to disk.

9. The method of claim 1, wherein the data block updates can be undone.

10. The method of claim 1, wherein the method is performed while maintaining transaction management.

11. The method of claim 1, wherein the method is performed while maintaining recoverability.

12. The method of claim 1, wherein the method is performed while maintaining database query capability.

13. The method of claim 1, wherein the method is performed while maintaining transaction management, recoverability, and database query capability.

14. A computer program product embodied on a volatile or non-volatile computer readable medium, the computer readable medium having stored thereon a sequence of instructions which, when executed by a processor, causes the processor to execute a method for writing to disk, the method comprising:
   a) receiving an update to a data block;
   b) appending the updated data block to the end of an extent;
   c) repeating a) and b) until there are a plurality of contiguous updates at the end of the extent; and
   d) updating the disk with the plurality of contiguous updates in no more than one disk access.

15. The computer program product of claim 14, wherein appending comprises:
   locating contiguous free space in a file of extents;
   placing the updated data block in the contiguous free space.

16. The computer program product of claim 14, wherein appending comprises:
   searching for contiguous free space in a file of extents;
   finding no contiguous free space in the file of extents;
   adding new extents to the file of extents;
   placing the updated data block in the added extents.

17. The computer program product of claim 14, wherein the updated data block has an address indicating the origin of the data block and an address indicating the appended location of the data block.

18. The computer program product of claim 14, wherein the method is performed while maintaining transaction management, recoverability, and database query capability.

19. A system for writing to disk, the system comprising:
   a) logic configured to receive an update to a data block;
   b) logic configured to append the updated data block to the end of an extent;
   c) logic configured to repeat a) and b) until there are a plurality of contiguous updates at the end of the extent; and
   d) logic configured to update the disk with the plurality of contiguous updates in no more than one disk access.

20. The system of claim 19, wherein the logic configured to append comprises:
   logic configured to locate contiguous free space in a file of extents;
   logic configured to place the updated data block in the contiguous free space.

21. The system of claim 19, wherein the logic configured to append comprises:
   logic configured to search for contiguous free space in a file of extents;
   logic configured to find no contiguous free space in the file of extents;
   logic configured to add new extents to the file of extents;
   logic configured to place the updated data block in the added extents.

22. A method of writing to a disk, the method comprising:
   a) identifying an area of contiguous free space in an object memory;
   b) receiving a plurality of updates to the data block;
   c) placing the plurality of data block updates in the area of contiguous free space in the object memory;
   d) updating the disk with the plurality of contiguous updates in no more than one disk access.

23. The method of claim 22, wherein identifying an area of contiguous free space comprises:
   searching for contiguous free space in a plurality of extents in the object memory;
   finding no free contiguous space in the extents;
   defragmenting one or more extents; and
   identifying an area of contiguous free space in the defragmented extents.

24. The method of claim 22, wherein identifying an area of contiguous free space comprises:
   searching for contiguous free space in a plurality of extents in the object memory;
   finding no free contiguous space in the extents;
   adding new extents to the file of extents; and
   placing the updated data block in the added extents.

25. The computer program product of claim 22, wherein the method is performed while maintaining transaction management.

26. The computer program product of claim 22, wherein the method is performed while maintaining recoverability.

27. The computer program product of claim 22, wherein the method is performed while maintaining database query capability.

28. The method of claim 22, wherein the method is performed while maintaining transaction management, recoverability, and database query capability.

29. A computer program product embodied on a volatile or non-volatile computer readable medium, the computer readable medium having stored thereon a sequence of instructions which, when executed by a processor, causes the processor to execute a method for writing to disk, the method comprising:
   a) identifying an area of contiguous free space in an object memory;
   b) receiving a plurality of updates to the data block;
   c) placing the plurality of data block updates in the area of contiguous free space in the object memory;
   d) updating the disk with the plurality of contiguous updates in no more than one disk access.

30. The computer program product of claim 29, wherein the method is performed while maintaining transaction management, recoverability, and database query capability.

* * * * *

UNITED STATES PATENT AND TRADEMARK OFFICE
CERTIFICATE OF CORRECTION

PATENT NO. : 7,418,544 B2
APPLICATION NO. : 11/245359
DATED : August 26, 2008
INVENTOR(S) : Mukherjee et al.

It is certified that error appears in the above-identified patent and that said Letters Patent is hereby corrected as shown below:

On sheet 12 of 16, in Figure 5A, Box No. 502, line 1, delete "DBA" and insert -- RDBA --, therefor.

On sheet 12 of 16, in Figure 5A, Box No. 504, line 2, delete "DBA" and insert -- RDBA --, therefor.

On sheet 12 of 16, in Figure 5A, Box No. 508, line 3, delete "DBA" and insert -- RDBA --, therefor.

On sheet 12 of 16, in Figure 5A, Box No. 510, line 3, delete "DBA" and insert -- RDBA --, therefor.

In column 2, line 40, after "ability" insert -- . --.

In column 6, line 12, delete "fiction." and insert -- function. --, therefor.

In column 6, line 16, delete "a" and insert -- an --, therefor.

In column 6, line 36, delete "FIG." and insert -- FIGS. --, therefor.

In column 8, line 14, after "that" delete "that".

In column 8, line 62, delete "datablock" and insert -- data block --, therefor.

In column 9, line 63, delete "RBDA" and insert -- RDBA --, therefor.

In column 12, line 14, in claim 6, delete "whereon" and insert -- wherein --, therefor.

In column 12, line 18-19, in claim 8, after "updates" delete "updates".

Signed and Sealed this

Sixteenth Day of March, 2010

David J. Kappos
*Director of the United States Patent and Trademark Office*